US012686281B2

(12) United States Patent
Koga et al.

(10) Patent No.: US 12,686,281 B2
(45) Date of Patent: Jul. 21, 2026

(54) DRIVE CONTROL DEVICE FOR ELECTRIC VEHICLE

(71) Applicant: MITSUBISHI JIDOSHA KOGYO KABUSHIKI KAISHA, Tokyo (JP)

(72) Inventors: Ryosuke Koga, Tokyo (JP); Akira Maruyama, Tokyo (JP); Tetsuya Furuichi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 743 days.

(21) Appl. No.: 17/926,080

(22) PCT Filed: Jul. 14, 2021

(86) PCT No.: PCT/JP2021/026378
§ 371 (c)(1),
(2) Date: Nov. 17, 2022

(87) PCT Pub. No.: WO2022/024753
PCT Pub. Date: Feb. 3, 2022

(65) Prior Publication Data
US 2023/0182579 A1 Jun. 15, 2023

(30) Foreign Application Priority Data

Jul. 30, 2020 (JP) ................................. 2020-128753

(51) Int. Cl.
*B60L 7/26* (2006.01)
*B60L 15/20* (2006.01)
(Continued)

(52) U.S. Cl.
CPC ............. *B60L 7/26* (2013.01); *B60L 15/2009* (2013.01); *B60L 15/2036* (2013.01); *B60L 50/16* (2019.02); *B60L 2240/423* (2013.01)

(58) Field of Classification Search
CPC .... B60L 7/26; B60L 15/2009; B60L 15/2036; B60L 50/16; B60L 2240/423; B60L 2240/22; B60W 2720/14; B60T 8/1755
See application file for complete search history.

(56) References Cited

U.S. PATENT DOCUMENTS 8,195,348 B2 * 6/2012 Mizutani ............... B60W 20/30
180/65.265
9,296,374 B2 * 3/2016 Yamakado ........... B60W 40/114
(Continued)

FOREIGN PATENT DOCUMENTS

EP 2 905 193 A1 8/2015
JP 2005-247276 A 9/2005
(Continued)

OTHER PUBLICATIONS

Japanese Office Action for Japanese Application No. 2022-540148, dated Nov. 8, 2023, with English translation.
(Continued)

*Primary Examiner* — Thomas W Irvin
(74) *Attorney, Agent, or Firm* — Birch, Stewart, Kolasch & Birch, LLP

(57) ABSTRACT

In a drive control device for an electric vehicle that includes brake devices (30a to 30d) provided for each of left and right wheels of the vehicle, a front motor (4) and a rear motor (6) for driving and regeneratively braking the wheels of the vehicle, a vehicle motion control unit (37) for calculating a brake application demanded amount corresponding to a yaw moment application amount to be applied to the vehicle based on the traveling state of the vehicle, a brake ECU (31) for controlling the brake devices (30a to 30d) on the left and right sides independently of each other based on the brake application demanded amount to control the yaw moment of the vehicle, and a motor torque control unit (39) for controlling driving torques and regenerative braking torques of
(Continued)

a front motor (4) and a rear motor (6), the motor torque control unit (39) executes correction for increasing the driving torque or reducing the regenerative braking torque according to the increase of the braking torques of the brake devices (30*a* to 30*d*) based on the brake application demanded amount.

4 Claims, 7 Drawing Sheets

(51) Int. Cl.
　B60L 50/16　　　　(2019.01)
　B60T 8/1755　　　　(2006.01)

(56) References Cited

U.S. PATENT DOCUMENTS

| | | | | |
|---|---|---|---|---|
| 9,403,446 | B2 * | 8/2016 | Hashizaka | B60L 3/12 |
| 9,623,850 | B2 * | 4/2017 | Yamakado | B60L 3/102 |
| 10,654,470 | B2 * | 5/2020 | Sato | B60W 30/18145 |
| 11,136,043 | B2 * | 10/2021 | Kambe | B60W 30/182 |
| 11,718,285 | B2 * | 8/2023 | Hwang | B60W 30/045 |
| | | | | 701/41 |
| 2009/0088914 | A1 * | 4/2009 | Mizutani | B60K 17/356 |
| | | | | 180/65.265 |
| 2015/0239442 | A1 * | 8/2015 | Yamakado | B60T 8/17555 |
| | | | | 701/70 |
| 2015/0352978 | A1 * | 12/2015 | Hashizaka | B60L 15/2036 |
| | | | | 701/22 |
| 2016/0244038 | A1 * | 8/2016 | Yamakado | B60L 7/26 |
| 2017/0106755 | A1 | 4/2017 | Nakatsu | |
| 2019/0276039 | A1 * | 9/2019 | Kambe | B60W 40/114 |
| 2022/0080953 | A1 * | 3/2022 | Hwang | B60W 10/22 |
| 2023/0182579 | A1 * | 6/2023 | Koga | B60W 10/20 |
| | | | | 303/152 |
| 2023/0278541 | A1 * | 9/2023 | Shibata | B60W 30/18127 |
| | | | | 701/22 |
| 2025/0026206 | A1 * | 1/2025 | Kim | B60T 8/1766 |

FOREIGN PATENT DOCUMENTS

| | | | | |
|---|---|---|---|---|
| JP | 2011254590 A | * | 12/2011 | B60L 15/20 |
| JP | 2017-77753 A | | 4/2017 | |
| JP | 2019-123313 A | | 7/2019 | |

OTHER PUBLICATIONS

Japanese Office Action for Japanese Application No. 2022-540148, dated Apr. 24, 2024, with an English translation.
International Preliminary Report on Patentability and Written Opinion of the International Searching Authority for International Application No. PCT/JP2021/026378, dated Jan. 31, 2023, with an English translation.
Extended European Search Report for corresponding European Application No. 21850565.9, dated Feb. 20, 2024.
International Search Report for PCT/JP2021/026378 mailed on Oct. 12, 2021.
Written Opinion of the International Searching Authority for PCT/JP2021/026378 mailed on Oct. 12, 2021.
Japanese Office Action for Japanese Application No. 2022-540148, dated Apr. 19, 2023, with an English translation.

* cited by examiner

DRIVE CONTROL DEVICE FOR ELECTRIC VEHICLE

TECHNICAL FIELD

The present invention relates to a drive control device for an electric vehicle that can perform braking control on left and right wheels independently of each other.

BACKGROUND ART

In recent years, there has been developed a braking and driving device that controls each of a driving torque and a braking torque of a vehicle with different values between left and right wheels (travel wheels) in order to prevent a sideslip of the vehicle and improve turning performance of the vehicle. An antiskid brake system for a vehicle, an active yaw control device, and the like are known as the above braking and driving device. For example, a vehicle disclosed in Patent Document 1 includes a drive motor and a brake device for each of the left, right, front, and rear wheels of the vehicle, and is capable of controlling the respective drive motors and the respective brake devices independently of one another. In Patent Document 1, the yaw moment of the vehicle is controlled by operating and controlling the drive motor or the brake device based on a steering angle and an actual yaw rate.

PRIOR ART DOCUMENT

Patent Document

Patent Document 1: Japanese Patent Laid-Open No. 2005-247276

SUMMARY OF THE INVENTION

Problems to be Solved by the Invention

In the braking and driving device as described above, a device for controlling the yaw moment of the vehicle only by the braking torque of a brake device can perform the control relatively inexpensively, and is highly versatile.

However, application of a braking torque by a brake device causes reduction in speed of the vehicle as a whole, so that a driver may feel uncomfortable.

Further, the brake device has a problem that it is difficult to accurately control the braking torque due to variations in the state of brake discs and the like.

The present invention has been made in view of such a problem, and has an object to provide a drive control device for an electric vehicle that can mitigate discomfort caused by braking in a vehicle in which the yaw moment of the vehicle is controlled by braking the wheels.

Means for Solving the Problems

In order to achieve the above object, an aspect of the present invention is directed to provide a drive control device for an electric vehicle that comprises: braking devices provided for each of left and right wheels of the vehicle; an electric motor for driving and regeneratively braking the wheels of the vehicle; a vehicle motion control unit for calculating a yaw moment application amount to be applied to the vehicle based on a traveling state of the vehicle; a braking device control unit for controlling the braking devices on the left and right independently of each other based on the yaw moment application amount calculated by the vehicle motion control unit to control a yaw moment of the vehicle; and a motor control unit for controlling a driving torque and a regenerative braking torque of the electric motor, wherein the motor control unit executes correction control for increasing the driving torque or reducing the regenerative braking torque of the electric motor according to an increase of a braking torque of the braking device by the braking device control unit.

As a result, when the yaw moment of the vehicle is controlled by the braking device control unit, the vehicle is braked by the braking device. According to this increase of the braking torque, the driving torque by the motor control unit is increased or the regenerative braking torque by the motor control unit is reduced, whereby it is possible to moderate the deceleration of the vehicle.

Preferably, the braking device control unit may execute, based on the traveling state of the vehicle, turn assist control for increasing a braking torque of the braking device on a turn inner-wheel side during turning travel of the vehicle to promote turning of the vehicle or turn spin suppression control for increasing a braking torque of the braking device on a turn outer-wheel side during turning travel of the vehicle to suppress turning of the vehicle, and the motor control unit may execute correction control of the driving torque or the regenerative braking torque that differs between when the turn assist control is executed and when the turn spin suppression control is executed.

Accordingly, the control of the left and right braking devices by the braking device control unit makes it possible to perform the turn assist control for promoting turning of the vehicle and the turn spin suppression control for suppressing turning of the vehicle. Further, the turn assist control and the turn spin suppression control respectively execute different correction control operations for the driving torque and the regenerative braking torque to appropriately correct the driving torque or the regenerative braking torque, so that it is possible to improve the turning performance or the travel stability performance of the vehicle.

Specifically, the vehicle may include a front-wheel drive motor for driving left and right front wheels and a rear-wheel drive motor for driving left and right rear wheels, and according to an increase in the braking torque of the braking device by the braking device control unit, the motor control unit may increase a driving torque of the rear-wheel drive motor more than a driving torque of the front-wheel drive motor when the turn assist control is executed during acceleration travel, and increase the driving torque of the front-wheel drive motor more than the driving torque of the rear-wheel drive motor when the turn spin suppression control is executed during acceleration travel.

As a result, when the turn assist control is executed during acceleration travel, the driving torque of the rear-wheel drive motor is increased more than the driving torque of the front-wheel drive motor, whereby it is possible to ensure the turning performance while suppressing reduction in speed. Further, when the turn spin suppression control is executed during acceleration travel, the driving torque of the front-wheel drive motor is increased more than the driving torque of the rear-wheel drive motor, whereby it is possible to ensure travel stability performance by suppressing turn spin while suppressing reduction in speed.

Preferably, the vehicle may include a front-wheel drive motor for driving left and right front wheels and a rear-wheel drive motor for driving left and right rear wheels, and according to an increase in the braking torque of the braking device by the braking device control unit, the motor control unit may reduce a regenerative braking torque of the front-wheel drive motor more than a regenerative braking torque of the rear-wheel drive motor when the turn assist control is executed during deceleration travel, and reduce the regenerative braking torque of the rear-wheel drive motor more than the regenerative braking torque of the front-wheel drive motor when the turn spin suppression control is executed during deceleration travel.

As a result, when the turn assist control is executed during deceleration travel, the regenerative braking torque of the front-wheel drive motor is reduced more than the regenerative braking torque of the rear-wheel drive motor, whereby it is possible to ensure the turning performance of the vehicle while suppressing reduction in speed. Further, when the turn spin suppression control is executed during deceleration travel, the driving torque of the rear-wheel drive motor is reduced more than the driving torque of the front-wheel drive motor, whereby it is possible to ensure travel stability performance by suppressing turn spin while suppressing reduction in speed.

Preferably, the motor control unit may be capable of controlling driving torques of the left and right wheels independently of each other, the vehicle motion control unit may calculate, based on a traveling state of the vehicle, a yaw moment distribution amount for distributing the yaw moment application amount to be applied to the vehicle into a first yaw moment application amount by the braking device and a second yaw moment application amount by the electric motor, the braking device control unit and the motor control unit may control the braking device and the electric motor respectively based on the yaw moment distribution amount, and according to an increase in the braking torque of the braking device by the braking device control unit, the motor control unit may increase a driving torque of the wheel on a turn inner-wheel side more than a driving torque of the wheel on a turn outer-wheel side when the turn assist control is executed during acceleration travel, and increase the driving torque of the wheel on the turn outer-wheel side more than the driving torque of the wheel on the turn inner-wheel side when the turn spin suppression control is executed during acceleration travel.

As a result, in a vehicle capable of controlling the driving torques of the left and right wheels independently of each other, each torque is determined so as to satisfy the total of the yaw moment application amount calculated in the vehicle motion control unit when the turn assist control is executed during acceleration travel. For example, when the total of the yaw moment application amount is constant and the braking torque is to be increased, the driving torque of the wheel on the turn inner-wheel side is increased more than the driving torque of the wheel on the turn outer-wheel side, whereby it is possible to ensure travel stability performance by suppressing excessive turning while suppressing reduction in speed. Further, when the turn spin suppression control is executed during acceleration travel, the driving torque of the wheel on the turn inner-wheel side is increased more than the driving torque of the wheel on the turn outer-wheel side, whereby it is possible to ensure turning performance by suppressing excessive turn spin suppression while suppressing reduction in speed.

Preferably, the motor control unit may be capable of controlling driving torques of the left and right wheels independently of each other, the vehicle motion control unit may calculate, based on a traveling state of the vehicle, a yaw moment distribution amount for distributing the yaw moment application amount to be applied to the vehicle into a first yaw moment application amount by the braking device and a second yaw moment application amount by the electric motor, the braking device control unit and the motor control unit may control the braking device and the electric motor respectively based on the yaw moment distribution amount, and according to an increase in the braking torque of the braking device by the braking device control unit, the motor control unit may reduce a regenerative braking torque of the wheel on a turn inner-wheel side more than a regenerative braking torque of the wheel on a turn outer-wheel side when the turn assist control is executed during deceleration travel, and reduce the regenerative braking torque of the wheel on the turn outer-wheel side more than the regenerative braking torque of the wheel on the turn inner-wheel side when the turn spin suppression control is executed during deceleration travel.

As a result, in a vehicle capable of controlling the driving torques of the left and right wheels independently of each other, each torque is determined so as to satisfy the total of the yaw moment application amount calculated in the vehicle motion control unit when the turn assist control is executed during deceleration travel. For example, when the total of the yaw moment application amount is constant and the braking torque is to be increased, the regenerative braking torque of the wheel on the turn inner-wheel side is reduced more than the regenerative braking torque of the wheel on the turn outer-wheel side, whereby it is possible to secure travel stability performance by suppressing excessive turning while suppressing reduction in speed. Further, when the turn spin suppression control is executed during deceleration travel, the regenerative braking torque of the wheel on the turn outer-wheel side is reduced more than the regenerative braking torque of the wheel on the turn inner-wheel side, whereby it is possible to secure the turning performance by suppressing excessive turn spin suppression while suppressing reduction in speed.

Advantageous Effects of the Invention

In a vehicle attitude control device of the present invention, the vehicle is braked by the braking device when the yaw moment of the vehicle is controlled by the braking device control unit. According to this increase of the braking torque, the torque is increased or the regenerative braking torque is reduced by the motor control unit, whereby it is possible to moderate the reduction in speed of the vehicle.

Therefore, when the yaw moment of the vehicle is controlled by the braking device control unit, the driver's feeling of unexpected deceleration is moderated, which makes it possible to drive with less discomfort.

5                                          6

Figure 5:
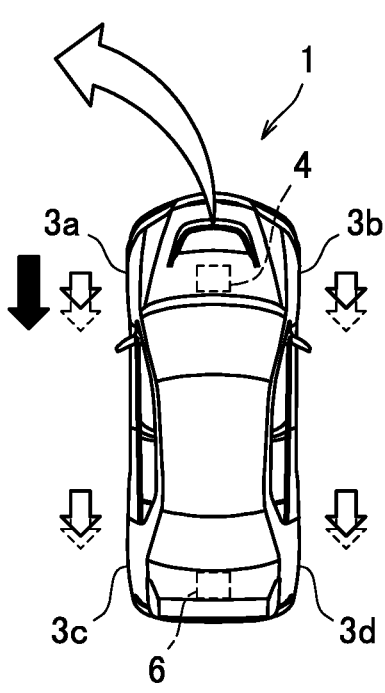

FIG. 5 is an image diagram showing an example of setting a regenerative braking torque when turn assist control is executed during left-turn deceleration travel of the vehicle including the drive control device according to the first embodiment.

Figure 6:
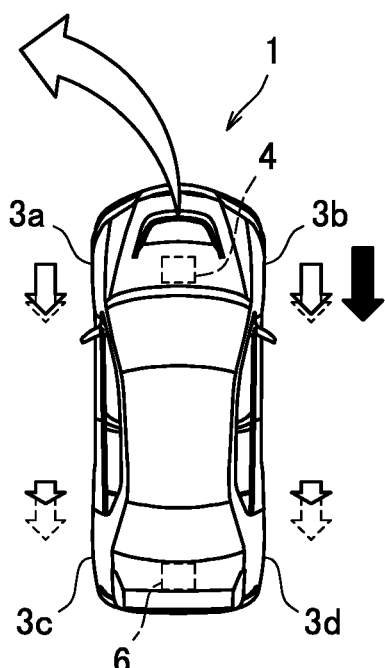

FIG. 6 is an image diagram showing an example of setting a regenerative braking torque when spin suppression control is executed during left-turn deceleration travel of the vehicle including the drive control device according to the first embodiment.

Figure 7:
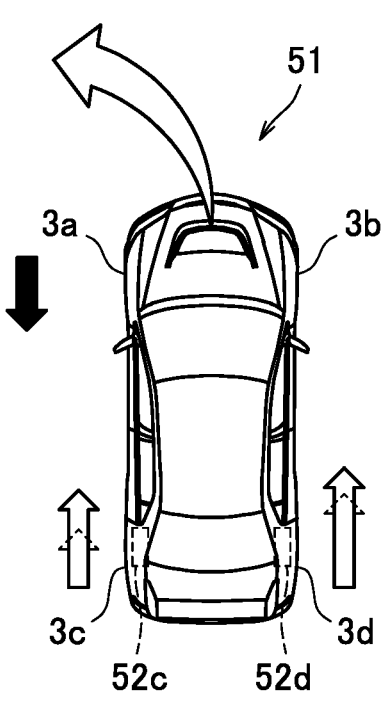

FIG. 7 is an image diagram showing an example of setting a driving torque when turn assist control is executed during left-turn acceleration travel of a vehicle including a drive control device according to a second embodiment.

Figure 8:
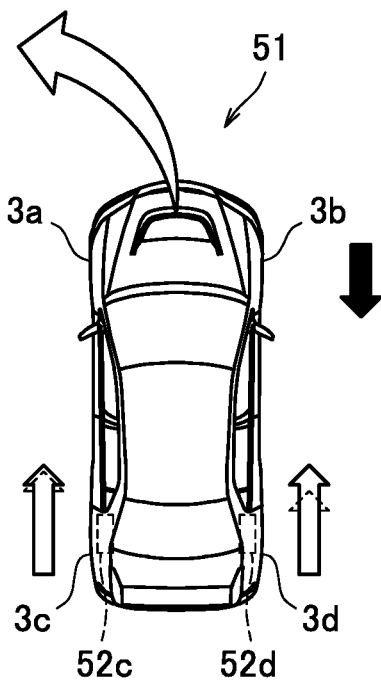

FIG. 8 is an image diagram showing an example of setting a driving torque when spin suppression control is executed during left-turn acceleration travel of the vehicle including the drive control device according to the second embodiment.

Figure 9:
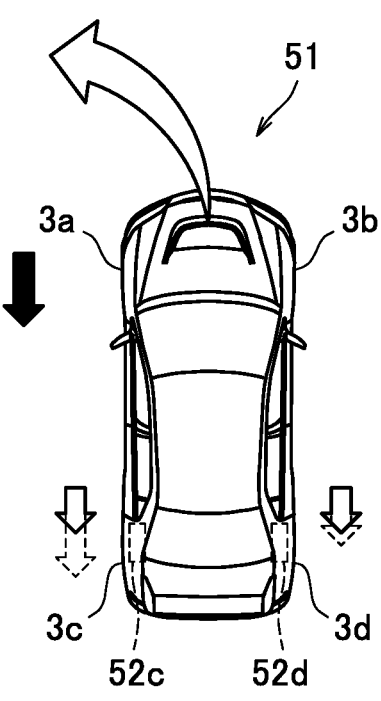

FIG. 9 is an image diagram showing an example of setting a regenerative braking torque when turn assist control is executed during left-turn deceleration travel of the vehicle including the drive control device according to the second embodiment.

Figure 10:
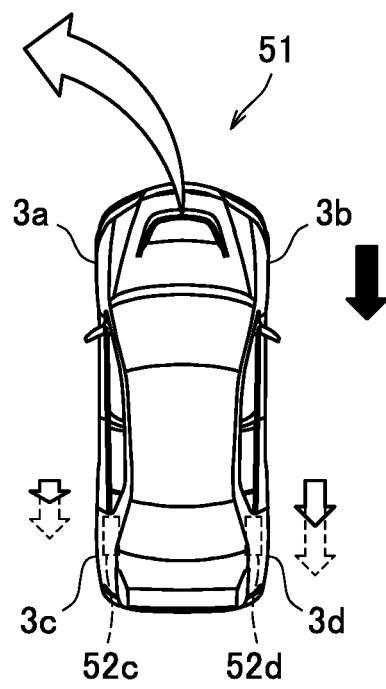

FIG. 10 is an image diagram showing an example of setting a regenerative braking torque when spin suppression control is executed during left-turn deceleration travel of the vehicle including the drive control device according to the second embodiment.

Figure 11:
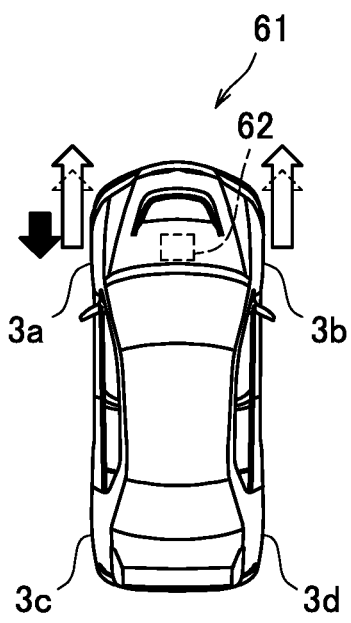

FIG. 11 is an image diagram showing an example of setting a driving torque during straight ahead acceleration travel of a vehicle including a drive control device according to a third embodiment.

Figure 12:
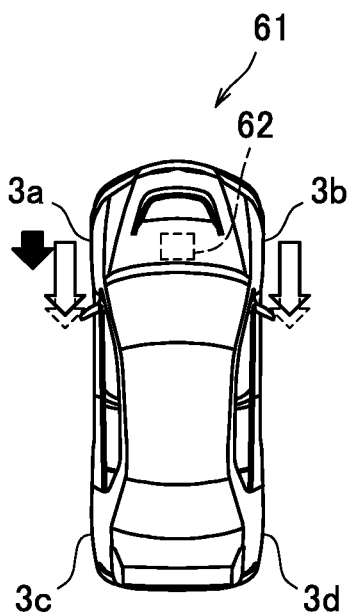

FIG. 12 is an image diagram showing an example of setting a regenerative braking torque during straight ahead deceleration travel of a vehicle provided with the drive control device according to the third embodiment.

MODE FOR CARRYING OUT THE INVENTION

Figure 1:
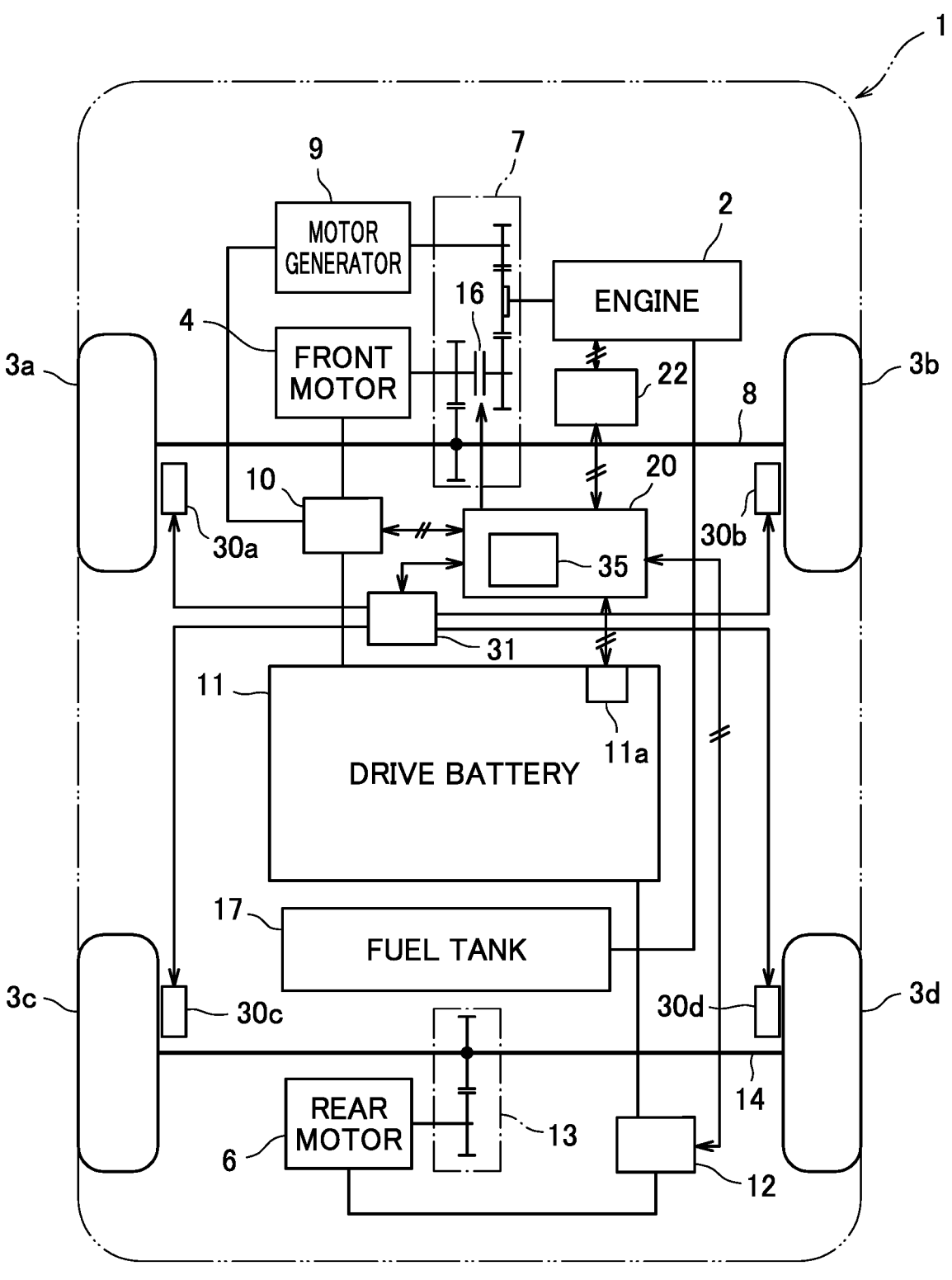
FIG. 1 is a schematic configuration diagram of a hybrid vehicle including a drive control device according to a first embodiment of the present invention.

FIG. 1 is a schematic configuration diagram of a hybrid vehicle (hereinafter referred to as vehicle 1) including a drive control device according to a first embodiment of the present invention.

The vehicle 1 (electric vehicle) of the first embodiment adopting the drive control device of the present invention is a four-wheel drive vehicle which can be driven by driving the front wheels 3*a* and 3*b* (wheels) with the output of an engine 2 and includes an electric front motor 4 (front wheel drive motor, electric motor) for driving the front wheels 3*a* and 3*b*, and an electric rear motor 6 (rear wheel drive motor, electric motor) for driving the rear wheels 3*c* and 3*d* (wheels).

The engine 2 can drive a driving shaft 8 of the front wheels 3 via a front transaxle 7, and can also drive a motor generator 9 via the front transaxle 7 to generate electricity. Further, the engine 2 and the front wheels 3*a* and 3*b* are connected via a clutch 16 arranged in the front transaxle 7.

The front motor 4 is supplied with high-voltage electric power from a drive battery 11 and the motor generator 9 mounted in the vehicle 1 via a front control unit 10 to be driven, and drives the driving shaft 8 of the front wheels 3*a* and 3*b* via the front transaxle 7.

The rear motor 6 is supplied with high-voltage electric power from the drive battery 11 via a rear control unit 12 to be driven, and drives a driving shaft 14 of the rear wheels 3*c* and 3*d* via a rear transaxle 13.

The electric power generated by the motor generator 9 can charge the drive battery 11 via the front control unit 10, and can supply electric power to the front motor 4 and the rear motor 6.

The drive battery 11 is configured by a secondary battery such as a lithium ion battery, and includes a battery module (not shown) configured by assembling a plurality of battery cells. Further, the drive battery 11 includes a charge rate detection unit 11*a* for detecting a charging rate SOC of the drive battery 11.

The front control unit 10 has a function of controlling the driving torque and regenerative braking torque of the front motor 4 and controlling the power generation amount and output of the motor generator 9 based on a control signal from a hybrid control unit 20 installed in the vehicle 1.

The rear control unit 12 has a function of controlling the driving torque and regenerative braking torque of the rear motor 6 based on a control signal from the hybrid control unit 20.

An engine control unit 22 is a control device for the engine 2, and is configured to include an input/output device, a storage device (ROM, RAM, non-volatile RAM, etc.), a central processing unit (CPU), a timer, and the like. The engine control unit 22 performs the drive control of the engine 2 by controlling a fuel injection amount, a fuel injection timing, an intake amount, and the like in the engine 2 based on a control signal (demanded output) from the hybrid control unit 20.

Further, the vehicle 1 includes a fuel tank 17 for storing fuel to supply fuel to the engine 2, and a charger (not shown) for charging the drive battery 11 with an external power source.

The hybrid control unit 20 is a control device for performing comprehensive control of the vehicle 1, and is configured to include an input/output device, a storage device (ROM, RAM, non-volatile RAM, etc.), a central processing unit (CPU), a timer, and the like.

The front control unit 10, the rear control unit 12, and the engine control unit 22 are connected to the input side of the hybrid control unit 20, and detection and operation information from these units is input to the hybrid control unit 20.

Further, the front control unit 10, the rear control unit 12, the engine control unit 22, and the clutch 16 of the front transaxle 7 are connected to the output side of the hybrid control unit 20.

The hybrid control unit 20 calculates a vehicle demanded output necessary for driving the vehicle 1 based on various detection amounts such as the accelerator operation information degree of the vehicle 1 and various operation information, and transmits control signals to the engine control unit 22, the front control unit 10 and the rear control unit 12 to control switching of a travel mode (EV mode, series mode, parallel mode), the outputs of the engine 2, the front motor 4 and the rear motor 6, the generated power and output of the motor generator 9, and the connection and disconnection of the clutch 16 on the front transaxle 7.

In the EV mode, the engine 2 is stopped, and the front motor 4 and the rear motor 6 are driven with electric power supplied from the drive battery 11 to drive the vehicle.

In the series mode, the clutch 16 of the front transaxle 7 is disconnected, and the motor generator 9 is actuated by the engine 2. Then, the front motor 4 and the rear motor 6 are driven with electric power generated by the motor generator 9 and electric power supplied from the drive battery 11 to drive the vehicle. Further, in the series mode, the rotation speed of the engine 2 is set to an efficient value, and electric power generated by a surplus output is supplied to the drive battery 11 to charge the drive battery 11.

In the parallel mode, the clutch 16 of the front transaxle 7 is connected to mechanically transmit power from the engine 2 via the front transaxle 7 to drive the front wheels 3a and 3b. Further, the front motor 4 and the rear motor 6 are driven with electric power generated by actuating the motor generator 9 by the engine 2 and electric power supplied from the drive battery 11 to drive the vehicle.

The hybrid control unit 20 sets the travel mode to the parallel mode in a region where the efficiency of the engine 2 is high, for example, in a high-speed region. Further, in regions excluding the parallel mode, that is, in medium and low speed regions, the EV mode and the series mode are switched to each other based on the charging rate SOC (charge amount) of the drive battery 11.

Further, the wheels 3a to 3d of the vehicle 1 are provided with brake devices 30a, 30b, 30c, and 30d (braking devices) for applying a braking torque, respectively. The brake devices 30a to 30d are controlled by a brake ECU 31 (braking device control unit), and configured to be capable of controlling the braking torque for the corresponding wheels 3a to 3d independently of one another. The brake ECU 31 is connected to the hybrid control unit 20 so that mutual communication can be performed therebetween, and controls the operation of each of the brake devices 30a to 30d based on an operation signal of a brake pedal from a brake pedal sensor (not shown) or the like.

Figure 2:
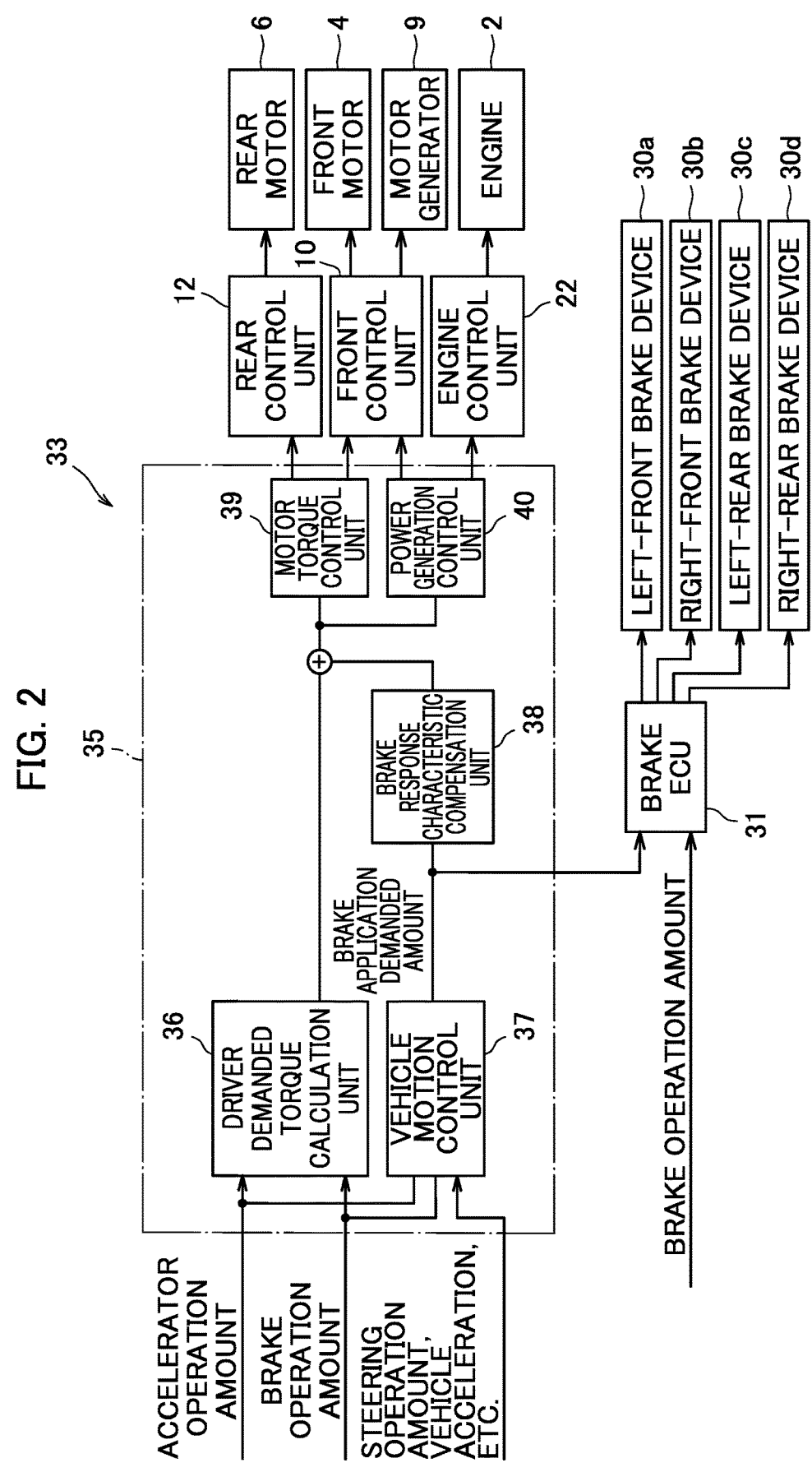
FIG. 2 is a block diagram showing a schematic configuration of a drive control device according to the first embodiment.

FIG. 2 is a block diagram showing a schematic configuration of a drive control device 33 according to the first embodiment.

The drive control device 33 of the first embodiment includes a drive control unit 35 for controlling the operation of the motors 4 and 6, the engine 2, and the motor generator 9 to control the driving operation of the vehicle 1.

The drive control unit 35 is provided in the hybrid control unit 20, and includes a driver demanded torque calculation unit 36, a vehicle motion control unit 37, a brake response characteristic compensation unit 38, a motor torque control unit 39 (motor control unit), and a power generation control unit 40.

The driver demanded torque calculation unit 36 receives an accelerator operation amount and a brake operation amount to calculate the demanded torque of the driver of the vehicle 1. The demanded torque of the driver is a demanded torque of the vehicle 1 which is necessary to accelerate or decelerate the vehicle 1 in response to a driver's operation such as an accelerator operation or a brake operation.

The vehicle motion control unit 37 receives parameters related to turning travel such as a driving operation state and a traveling state of the vehicle 1, such as the accelerator operation amount, the brake operation amount, steering operation amount, an acceleration of the vehicle 1, and a yaw rate to determine whether it is necessary to perform turn assist control and turn spin suppression control. When determining that the turn assist control or turn spin suppression control is necessary, the vehicle motion control unit 37 outputs a brake application demanded amount corresponding to a yaw moment application amount for performing these control operations to the brake ECU 31.

The brake ECU 31 controls to correct the braking torques of the brake devices 30a to 30d based on the brake application demanded amount.

The turn assist control is the control for making the braking torques of the brake devices 30a to 30d on a steering direction side (turn inner-wheel side) of the vehicle 1 larger than the braking torques of the brake devices 30a to 30d on a steering direction opposite side (turn outer-wheel side) to increase the yaw moment of the vehicle 1 to the turn inner-wheel side, thereby promoting turning of the vehicle 1.

The turn spin suppression control is the control for making the braking torques of the brake devices 30a to 30d on the turn outer-wheel side of the vehicle 1 larger than the braking torques of the brake devices 30a to 30d on the turn inner-wheel side to increase the yaw moment of the vehicle 1 to the turn outer-wheel side, whereby excessive increase of the yaw moment during turning travel is suppressed to suppress spin of the vehicle 1.

The brake response characteristic compensation unit 38 receives a brake application demanded amount from the vehicle motion control unit 37 to calculate a motor torque correction amount so as to compensate the deceleration amount of the vehicle 1 based on the brake application demanded amount.

The motor torque control unit 39 receives the sum of the demanded torque output from the driver demanded torque calculation unit 36 and the motor torque correction amount output from the brake response characteristic compensation unit 38, and outputs the respective output demanded torques of the motors 4 and 6 to the front control unit 10 and the rear control unit 12.

The power generation control unit 40 receives the sum of the demanded torque output from the driver demanded torque calculation unit 36 and the motor torque correction amount output from the brake response characteristic compensation unit 38, and, if necessary, outputs operation control signals to the engine control unit 22 and the front control unit 10 so that power generation is performed by the engine 2 and the motor generator 9, for example, when power supplied from the drive battery 11 to the motors 4 and 6 is insufficient or when the charging rate of the drive battery 11 decreases.

Details of the motor torque correction amount calculated in the brake response characteristic compensation unit 38 will be described below.

Figure 3:
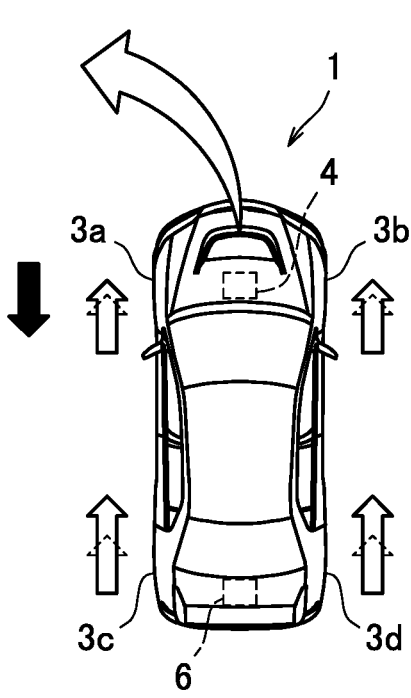
FIG. 3 is an image diagram showing an example of setting a driving torque when turn assist control is executed during left-turn acceleration travel of a vehicle including the drive control device according to the first embodiment.
Figure 4:
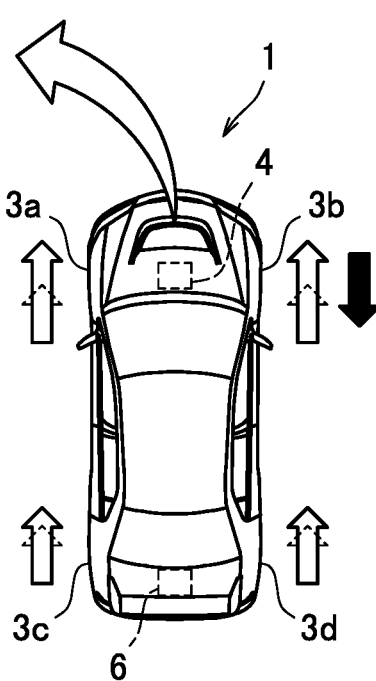
FIG. 4 is an image diagram showing an example of setting a driving torque when spin suppression control is executed during left-turn acceleration travel of the vehicle including the drive control device according to the first embodiment.

FIGS. 3 to 6 are image diagrams showing setting examples of the driving torque and the regenerative braking torque during the left-turning travel of the vehicle 1 including the drive control device according to the first embodiment, where FIG. 3 shows the setting example of the driving torque when the acceleration turn assist control is executed, FIG. 4 shows the setting example of the driving torque when the acceleration spin suppression control is executed, FIG. 5 shows the setting example of the regenerative braking torque when the deceleration turn assist control is executed, and FIG. 6 shows the setting example of the regenerative braking torque when the deceleration spin suppression control is executed.

In FIGS. 3 to 6 and FIGS. 7 to 10 described later, arrows drawn on the outside of the wheels 3a to 3d indicate the magnitude and driving direction of the driving torque or regenerative braking torque by the motors 4 and 6 for driving the wheels 3a to 3d, and outlined arrows show a case where motor torque correction is performed by the brake response characteristic compensation unit 38, and broken lines show a case no motor torque correction is performed. Black-painted arrows indicate the braking torque to be applied by the brake application demanded amount output from the vehicle motion control unit 37. Outline arrows drawn in the center of the front of the vehicle indicate left-turning travel of the vehicle 1.

The vehicle 1 of the first embodiment shown in FIGS. 3 to 6 includes the front motor 4 for driving left and right-front wheels 3a and 3b, and the rear motor 6 for driving the left and right-rear wheels 3*c* and 3*d*. The left and right driving torques are set to the same on each of the front and rear sides, but may be set to different values on the front and rear sides.

As shown in FIG. 3, in the vehicle 1 of the first embodiment, the turn assist control is performed by the vehicle motion control unit 37 during the left-turn acceleration travel, and when the left-front brake device 30*a* on the turn inner-wheel side brakes, the driving torques of the front motor 4 and the rear motor 6 are increased according to the braking torque, whereby the braking torque applied by the turn assist control is compensated by the increased amounts of the driving torques of the four wheels 3*a* to 3*d*. As a result, it is possible to suppress the reduction in speed of the vehicle 1 at an unexpected timing for the driver due to the turn assist control. Further, the turning performance can be enhanced by increasing the driving torque of the rear motor 6 more than that of the front motor 4, that is, by increasing the driving torque of the rear wheels 3*c* and 3*d* more than that of the front wheels 3*a* and 3*b*.

As shown in FIG. 4, the turn spin suppression control is performed by the vehicle motion control unit 37 during the left-turn acceleration travel of the vehicle 1, and when the right-front brake device 30*b* on the turn-outer wheel side brakes, the driving torques of the front motor 4 and the rear motor 6 are increased according to the braking torque, whereby the braking torque applied by the turn spin suppression control is compensated by the increased amounts of the driving torques of the four wheels 3*a* to 3*d*. As a result, it is possible to suppress the reduction in speed of the vehicle 1 at an unexpected timing for the driver due to the turn spin suppression control. Further, by increasing the driving torque of the front motor 4 more than that of the rear motor 6, that is, by increasing the driving torque of the front wheels 3*a* and 3*b* more than that of the rear wheels 3*c* and 3*d*, the straight ahead travel performance is enhanced, whereby the turn spin can be further suppressed to improve travel stability performance.

As shown in FIG. 5, during the left-turn deceleration travel of the vehicle 1, the turn assist control is performed by the vehicle motion control unit 37, and when the left-front brake device 30*a* on the turn inner-wheel side brakes, the regenerative braking torques of the front motor 4 and the rear motor 6 are reduced according to the braking torque, whereby the braking torque applied by the turn assist control is compensated by the reduced amounts of the regenerative braking torques of the four wheels 3*a* to 3*d*. As a result, it is possible to suppress the reduction in speed of the vehicle 1 at an unexpected timing for the driver due to the turn assist control. Further, by reducing the regenerative braking torque of the front motor 4 more than that of the rear motor 6, that is, by reducing the braking torques of the front wheels 3*a* and 3*b* more than those of the rear wheels 3*c* and 3*d*, slippage of the front wheels 3*a* and 3*b* is suppressed, whereby the turning performance can be secured.

As shown in FIG. 6, during the left-turn acceleration travel of the vehicle 1, the turn spin suppression control is performed by the vehicle motion control unit 37, and when the right-front brake device 30*b* on the turn outer-wheel side, the regenerative braking torques of the front motor 4 and the rear motor 6 are reduced according to the braking torque, whereby the braking torque applied by the turn spin suppression control is compensated by the reduced amounts of the regenerative braking torques of the four wheels 3*a* to 3*d*. As a result, it is possible to suppress the reduction in speed of the vehicle 1 at an unexpected timing for the driver due to the turn spin suppression control. Further, by reducing the regenerative braking torque of the rear motor 6 more than that of the front motor 4, that is, by reducing the regenerative braking torques of the rear wheels 3*c* and 3*d* more than those of the front wheels 3*a* and 3*b*, straight ahead travel performance is increased, whereby the turn spin can be suppressed and the travel stability performance can be improved.

As described above, in the present embodiment, when the turn assist control or the turn spin suppression control is executed during turning travel, the brake devices 30*a* and 30*b* are actuated, so that the speed of the vehicle 1 is reduced. In the present embodiment, the driving torques or regenerative braking torques of the motors 4 and 6 are corrected, which makes it possible to suppress the reduction in speed of the vehicle 1. Therefore, it is possible to suppress reduction in speed at an unexpected timing for the driver due to the turn assist control or the turn spin suppression control. In particular, the turn assist control can improve the turning performance while the turn spin suppression control can further suppress the turn spin to improve the travel stability.

Although the vehicle 1 of the first embodiment can operate in the parallel mode, it is desirable to apply the present invention in a driving mode in which the wheels 3*a* to 3*d* are driven only by the motors 4 and 6 as in the series mode or the EV mode, and the output of the engine 2 does not affect the driving torque of travel of the vehicle 1. By setting the driving mode such as the series mode or the EV mode in which the output of the engine 2 is not mechanically transmitted to the front wheels 3*a* and 3*b*, it is possible to control the driving/braking torques as a whole of the vehicle with high precision by using the motors 4 and 6 which can perform output control with higher precision than the engine 2.

FIGS. 7 to 10 are image diagrams showing setting examples of the driving torque and the braking torque during the left-turning travel of a vehicle 51 including a drive control device of a second embodiment, where FIG. 7 shows the setting example when the acceleration turn assist control is executed, FIG. 8 shows the setting example when the acceleration turn spin suppression control is executed, FIG. 9 shows the setting example when the deceleration turn assist control is executed, and FIG. 10 shows the setting example when the deceleration turn spin suppression control is executed.

The vehicle 51 of the second embodiment shown in FIGS. 7 to 10 is a vehicle including a so-called active yaw control device that includes a left-rear wheel motor 52*c* that mainly drives the left-rear wheel 3*c* of the vehicle 51, and a right-rear wheel motor 52*d* that mainly drives the right-rear wheel 3*d*, and can control the driving torque and the regenerative braking torque at the left and right-rear wheels 3*c* and 3*d* independently of each other.

A vehicle motion control unit 37 of the present embodiment calculates a yaw moment application amount and a yaw moment distribution amount to be applied to the vehicle based on the traveling state of the vehicle 1. Based on the yaw moment distribution amount, the yaw moment application amount is divided into a first yaw moment application amount which is a yaw moment application amount by each of the brake devices 30*a* to 30*d*, and a second yaw moment application amount which is a yaw moment application amount by each of the motors 52*c* and 52*d*. The vehicle motion control unit 37 outputs, to the brake ECU 31, a brake application demanded amount by the motors 52*c* and 52*d* which corresponds to the first yaw moment application amount, and outputs, to the brake response characteristic compensation unit 38, a brake application demanded amount by the motors 52*c* and 52*d* which corresponds to the second yaw moment application amount.

The brake ECU 31 performs correction control on the braking torques of the brake devices 30a to 30d based on the brake application demanded amount corresponding to the first yaw moment application amount. The brake response characteristic compensation unit 38 calculates a motor torque correction amount based on the brake application demanded amount corresponding to the second yaw moment application amount to perform correction control on the driving torques of the motors 52c and 52d. Therefore, the sum of the yaw moment application amount (first yaw moment application amount) based on the correction control of the braking torques of the brake devices 30a to 30d and the yaw moment application amount (second yaw moment application amount) based on the correction control of the driving torques of the motors 52c and 52d is controlled to be equal to the yaw moment application amount calculated based on the traveling state of the vehicle 1.

In the turn assist control of the vehicle 51 of the present embodiment, the braking torques of the brake devices 30a to 30d on the turn inner-wheel side are set to be larger than the braking torques of the brake devices 30a to 30d on the turn outer-wheel side, and the driving torques of the wheels 3a to 3d on the turn outer-wheel side are set to be larger than those on the turn inner-wheel side by the active yaw control device. Further, in the turn spin suppression control, the braking torques of the brake devices 30a to 30d on the turn outer-wheel side are set to be larger than the braking torques of the brake devices 30a to 30d on the turn inner-wheel side, and the driving torques of the wheels 3a to 3d on the turn inner-wheel side are set to be larger than those on the turn outer-wheel side by the active yaw control device.

Although the vehicle 51 of the second embodiment is a so-called FR vehicle in which the rear wheels are driven, it may be a vehicle in which the front wheels 3a and 3b can also be driven as in the first embodiment. In this case, no correction may be performed on the driving torques and regenerative braking torques of the front wheels 3a and 3b, or correction may be performed as in the first embodiment.

In the vehicle 51, for example, as shown in FIG. 7, when the turn assist control is performed by the vehicle motion control unit 37 during the left-turn acceleration travel and the left-front brake device 30a on the turn inner-wheel side brakes, the driving torques of the right-rear wheel motor 52d and the left-rear wheel motor 52c are increased according to the braking torque, whereby the braking torque applied by the turn assist control is compensated by the increased amounts of the driving torques of the left and right-rear wheels 3c, 3d. As a result, it is possible to suppress the reduction in speed of the vehicle 51 at an unexpected timing for the driver of the vehicle 51 due to the turn assist control. Further, the driving torque of the left-rear wheel motor 52c is increased more than that of the right-rear wheel motor 52d. Specifically, the driving torques of the left and right-rear wheels 3c and 3d are controlled so that the sum of the turning moment of the vehicle 51 generated by the braking of the left-front brake device 30a on the turn inner-wheel side and the turning moment of the vehicle 51 generated due to the difference in driving torque between the left and right-rear wheels matches the demanded turning moment (yaw moment application amount) of the vehicle 51. Therefore, it is possible to suppress an excessive increase in turning moment due to braking by the left-front brake device 30a on the turn inner-wheel side, and to improve the travel stability performance of the vehicle 51.

For example, as shown in FIG. 8, when the turn spin suppression control is performed by the vehicle motion control unit 37 during the left-turn acceleration travel and the right-front brake device 30b on the turn outer-wheel side brakes, the driving torques of the right-rear wheel motor 52d and the left-rear wheel motor 52c are increased according to the braking torque, whereby the braking torque applied by the turn assist control is compensated by the increased amounts of the driving torques of the left and right rear wheels 3c and 3d. As a result, it is possible to suppress reduction in speed of the vehicle 51 at an unexpected timing for the driver due to the turn spin suppression control. Further, by increasing the driving torque of the right-rear wheel motor 52d more than that of the left-rear wheel motor 52c, it is possible to suppress excessive reduction in turning moment due to braking by the right-front brake device 30b on the turn outer-wheel side, so that the turning performance of the vehicle 51 can be secured.

For example, as shown in FIG. 9, when the turn assist control is performed by the vehicle motion control unit 37 during the left-turn deceleration travel and the left-front brake device 30a on the turn inner-wheel side brakes, the regenerative braking torques of the right-rear wheel motor 52d and the left-rear wheel motor 52c are reduced according to the braking torque, whereby the braking torque applied by the turn assist control is compensated by the reduced amounts of the regenerative braking torques of the right-rear wheel motor 52d and the left-rear wheel motor 52c. As a result, it is possible to suppress the reduction in speed of the vehicle 51 at an unexpected timing for the driver due to the turn assist control. Further, by reducing the regenerative braking torque of the left-rear wheel motor 52c more than that of the right-rear wheel motor 52d, it is possible to suppress an excessive increase in turning moment due to braking of the left-front brake device 30a on the turn inner-wheel side, and the travel stability performance of the vehicle 51 can be improved.

For example, as shown in FIG. 10, when the turn spin suppression control is performed by the vehicle motion control unit 37 during the left-turn deceleration travel and the right-front brake device 30b on the turn outer-wheel side brakes, the regenerative braking torques of the right-rear wheel motor 52d and the left-rear wheel motor 52c are reduced according to the braking torque, whereby the braking torque applied by the turn spin suppression control is compensated by the reduced amounts of the regenerative braking torques of the right-rear wheel motor 52d and the left-rear wheel motor 52c. As a result, it is possible to suppress reduction in speed of the vehicle 51 at an unexpected timing for the driver due to the turn spin suppression control. Further, by reducing the regenerative braking torque of the right-rear wheel motor 52d more than that of the left-rear wheel motor 52c, it is possible to suppress excessive reduction in turning moment due to braking of the right-front brake device 30b on the turn outer-wheel side, so that the turning performance of the vehicle 51 can be ensured.

As described above, in the vehicle 51 of the second embodiment, the yaw moment of the vehicle can be controlled by the control using the brake devices 30a to 30d and the control of the driving torques or regenerative braking torques of the left and right rear wheels 3c and 3d, and appropriate turning travel can be performed by suppressing excessive turning or turn spin suppression when both are subjected to operation control.

FIGS. 11 and 12 are image diagrams showing setting examples of the driving torque and the braking torque during the straight ahead travel of a vehicle 61 including a drive control device of a third embodiment, where FIG. 11 shows the setting example during acceleration, and FIG. 12 shows the setting example during deceleration.

The vehicle 61 of the third embodiment shown in FIGS. 11 and 12 includes a front motor 62 for driving the front wheels.

In the vehicle 61 of the present embodiment, the vehicle motion control unit 37 can perform turn assist control and turn spin suppression control similar to those of the first embodiment and the second embodiment by controlling the brake devices 30a and 30b of the front wheels 3a and 3b and the front motor 62. In particular, it is possible to execute yaw moment control that improves straight ahead travel performance by the turn spin suppression control. The yaw moment control improves the straight ahead travel performance by activating the brake device 30a on an opposite side to a direction in which the yaw moment is generated when a yaw moment is generated, for example, in a right direction during straight ahead travel.

The vehicle 61 of the third embodiment is a so-called FF vehicle in which the front wheels 3a and 3b are driven, and the driving torques of the left and right front wheels 3a and 3b are the same. The vehicle may be capable of further driving the rear wheels 3c and 3d as in the first embodiment, and in this case, no correction may be performed on the driving torques and regenerative braking torques of the rear wheels 3c and 3d.

For example, as shown in FIG. 11, when the yaw moment control for improving the straight ahead travel performance is performed during straight ahead acceleration travel and the left-front brake device 30a brakes, the driving torques of the front wheels 3a and 3b are increased according to the braking torque, whereby the braking torque applied by the yaw moment control is compensated by the increased amounts of the driving torques of the left and right front wheels 3a and 3b. As a result, it is possible to suppress reduction in speed of the vehicle 61 at an unexpected timing for the driver due to the yaw moment control during straight ahead acceleration travel.

As shown in FIG. 12, when the yaw moment control for improving the straight ahead travel performance is performed during straight ahead deceleration travel and the left-front brake device 30a brakes, the regenerative braking torques of the front wheels 3a and 3b are reduced according to the braking torque, whereby the braking torque applied by the yaw moment control is compensated by the reduced amounts of the regenerative braking torques of the left and right front wheels 3a, 3b. As a result, it is possible to suppress reduction in speed of the vehicle 61 at an unexpected timing for the driver due to the yaw moment control during the straight ahead deceleration travel.

As described above, in the first to third embodiments, the yaw moment of the vehicle 1, 51, 61 is controlled by controlling the left and right brake devices 30a and 30b based on the traveling state of the vehicle 1, 51, 61 by the vehicle motion control unit 37. Therefore, the vehicle 1, 51, 61 may be braked at an unexpected timing for the driver. However, in the above embodiments, the driving torque or regenerative braking torque of the vehicle 1, 51, 61 is subjected to correction control based on the braking torque applied by the vehicle motion control unit 37. Specifically, according to an increase of the braking torque to be applied by the vehicle motion control unit 37, the driving torque of each of the motors 4 and 6 is increased during vehicle acceleration, whereas the regenerative braking torque by each of the motors 4 and 6 is reduced during vehicle deceleration. As a result, it is possible to moderate reduction in speed of the vehicle 61 due to braking at an unexpected timing for the driver by the vehicle motion control unit 37, thereby enabling the vehicle to be driven with less discomfort.

Furthermore, in the vehicle 1, 51 in which the driving torques of the wheels 3a to 3d can be controlled independently of one another with respect to the front and rear wheels or the left and right wheels as in the first and second embodiments, the driving torques or regenerative braking torques of the front and rear or left and right wheels 3a to 3d of the vehicle 1, 51 are controlled in conformity with the braking of the left and right brake devices 30a and 30b by the vehicle motion control unit 37, which enables the vehicle 1, 51 to perform appropriate turning travel.

The vehicle 61 of the third embodiment has a function of braking either of the left and right front wheels 3a and 3b in order to improve straight ahead travel stability. Even when the front wheels 3a and 3b are braked as described above, it is possible to suppress unexpected reduction in speed of the vehicle 61 for the driver by increasing the driving torques of the front wheels 3a and 3b or reducing the regenerative braking force of the front wheels 3a and 3b.

Although the description of the embodiments is finished as above, the mode of the present invention is not limited to the above embodiments. For example, in the first to third embodiments, the yaw moment of the vehicle 1, 51, 61 is controlled by controlling the brake devices 30a and 30b for the left and right front wheels 3a and 3b independently of each other. However, the present invention may be applied to a vehicle in which the yaw moment is controlled by controlling the brake devices 30c and 30d of the left and right rear wheels 3c and 3d independently of each other.

Further, in the second embodiment, there is provided the active yaw control system that controls the driving torques of the left and right rear wheels 3c and 3d independently of each other, but the present invention may be applied to a vehicle including an active yaw control system for controlling the driving torques of the left and right front wheels 3a and 3b independently of each other.

Further, in the first to third embodiments, the driving torque is corrected during acceleration travel, and the regenerative braking torque is corrected during deceleration travel. However, only one of both the corrections may be performed.

Further, in the second and third embodiments, the driving torque or the regenerative braking torque is corrected by both the turn assist control and the turn spin suppression control. However, the correction may be performed only when either control is executed.

Further, the present invention can be widely applied to vehicles in which left and right braking devices can be controlled independently of each other and driving can be performed by a motor.

EXPLANATION OF REFERENCE SIGNS 1, 51, 61 vehicle
3a, 3b front wheel (wheel)
3c, 3d rear wheel (wheel)
4 front motor (front wheel drive motor, electric motor)
6 rear motor (rear wheel drive motor, electric motor)
30a, 30b, 30c, 30d brake device (braking device)
31 brake ECU (braking device control unit)
33 drive control device
37 vehicle motion control unit
39 Motor torque control unit (motor control unit)

The invention claimed is:

1. A drive control device for an electric vehicle, comprising:

braking devices that are provided for each of left and right wheels of the vehicle;

an electric motor for driving and regeneratively braking the wheels of the vehicle;

a vehicle motion control unit for calculating a yaw moment application amount to be applied to the vehicle based on a traveling state of the vehicle;

a braking device control unit for controlling the braking devices on the left and right independently of each other based on the yaw moment application amount calculated by the vehicle motion control unit to control a yaw moment of the vehicle; and a motor control unit for controlling a driving torque and a regenerative braking torque of the electric motor, wherein the vehicle includes a front-wheel drive motor for driving both left and right front wheels and a rear-wheel drive motor for driving both left and right rear wheels as the electric motor, wherein the braking device control unit executes, based on the traveling state of the vehicle, turn assist control for increasing a braking torque of the braking devices on a turn inner-wheel side during turning travel of the vehicle to promote turning of the vehicle or turn spin suppression control for increasing a braking torque of the braking devices on a turn outer-wheel side during turning travel of the vehicle to suppress turning of the vehicle, and wherein according to an increase in the braking torque of the braking devices by the braking device control unit, the motor control unit increases a driving torque of the rear-wheel drive motor more than a driving torque of the front-wheel drive motor when the turn assist control is executed during acceleration travel, and increases the driving torque of the front-wheel drive motor more than the driving torque of the rear-wheel drive motor when the turn spin suppression control is executed during acceleration travel.

2. A drive control device for an electric vehicle, comprising:

braking devices that are provided for each of left and right wheels of the vehicle;

an electric motor for driving and regeneratively braking the wheels of the vehicle;

a vehicle motion control unit for calculating a yaw moment application amount to be applied to the vehicle based on a traveling state of the vehicle;

a braking device control unit for controlling the braking devices on the left and right independently of each other based on the yaw moment application amount calculated by the vehicle motion control unit to control a yaw moment of the vehicle; and a motor control unit for controlling a driving torque and a regenerative braking torque of the electric motor, wherein the vehicle includes a front-wheel drive motor for driving both left and right front wheels and a rear-wheel drive motor for driving both left and right rear wheels as the electric motor, wherein the braking device control unit executes, based on the traveling state of the vehicle, turn assist control for increasing a braking torque of the braking devices on a turn inner-wheel side during turning travel of the vehicle to promote turning of the vehicle or turn spin suppression control for increasing a braking torque of the braking devices on a turn outer-wheel side during turning travel of the vehicle to suppress turning of the vehicle, and wherein according to an increase in the braking torque of the braking device by the braking devices control unit, the motor control unit reduces a regenerative braking torque of the front-wheel drive motor more than a regenerative braking torque of the rear-wheel drive motor when the turn assist control is executed during deceleration travel, and reduces the regenerative braking torque of the rear-wheel drive motor more than the regenerative braking torque of the front-wheel drive motor when the turn spin suppression control is executed during deceleration travel.

3. A drive control device for an electric vehicle, comprising:

braking devices that are provided for each of left and right wheels of the vehicle;

an electric motor for driving and regeneratively braking for either one of the front and rear the wheels of the vehicle;

a vehicle motion control unit for calculating a yaw moment application amount to be applied to the vehicle based on a traveling state of the vehicle;

a braking device control unit for controlling the braking devices on the left and right independently of each other based on the yaw moment application amount calculated by the vehicle motion control unit to control a yaw moment of the vehicle; and a motor control unit for controlling a driving torque and a regenerative braking torque of the electric motor, wherein the motor control unit is capable of controlling driving torques of the left and right wheels independently of each other for the either one of the front and rear wheels of the vehicle, wherein the vehicle motion control unit calculates, based on a traveling state of the vehicle, a yaw moment distribution amount for distributing the yaw moment application amount to be applied to the vehicle into a first yaw moment application amount by the braking device and a second yaw moment application amount by the electric motor, wherein the braking device control unit and the motor control unit control the braking device and the electric motor respectively based on the yaw moment distribution amount, wherein the braking device control unit executes, based on the traveling state of the vehicle, turn assist control for increasing a braking torque of the braking device on a turn inner-wheel side of either the other of the front and rear wheels during turning travel of the vehicle to promote turning of the vehicle or turn spin suppression control for increasing a braking torque of the braking device on a turn outer-wheel side of the either the other of the front and rear wheels during turning travel of the vehicle to suppress turning of the vehicle, wherein according to an increase in the braking torque of the braking device by the braking device control unit, the motor control unit increases a driving torque on a turn inner-wheel side of the either one of the front and rear wheels more than a driving torque on a turn outer-wheel side when the turn assist control is executed during acceleration travel, and increases the driving torque on the turn outer-wheel side of the either one of the front and rear wheels more than the driving torque on the turn inner-wheel side when the turn spin suppression control is executed during acceleration travel.

4. A drive control device for an electric vehicle, comprising:

braking devices that are provided for each of left and right wheels of the vehicle;

an electric motor for driving and regeneratively braking for either one of the front and rear wheels of the vehicle;

a vehicle motion control unit for calculating a yaw moment application amount to be applied to the vehicle based on a traveling state of the vehicle;

a braking device control unit for controlling the braking devices on the left and right independently of each other based on the yaw moment application amount calculated by the vehicle motion control unit to control a yaw moment of the vehicle; and a motor control unit for controlling a driving torque and a regenerative braking torque of the electric motor, wherein the motor control unit is capable of controlling driving torques of the left and right wheels independently of each other for the either one of the front and rear wheels of the vehicle, wherein the vehicle motion control unit calculates, based on a traveling state of the vehicle, a yaw moment distribution amount for distributing the yaw moment application amount to be applied to the vehicle into a first yaw moment application amount by the braking device and a second yaw moment application amount by the electric motor, wherein the braking device control unit and the motor control unit control the braking device and the electric motor respectively based on the yaw moment distribution amount, wherein the braking device control unit executes, based on the traveling state of the vehicle, turn assist control for increasing a braking torque of the braking device on a turn inner-wheel side of either the other of the front and rear wheels during turning travel of the vehicle to promote turning of the vehicle or turn spin suppression control for increasing a braking torque of the braking device on a turn outer-wheel side of the either the other of the front and rear wheels during turning travel of the vehicle to suppress turning of the vehicle, wherein according to an increase in the braking torque of the braking device by the braking device control unit, the motor control unit reduces a regenerative braking torque on a turn inner-wheel side of the either one of the front and rear wheels more than a regenerative braking torque on a turn outer-wheel side when the turn assist control is executed during deceleration travel, and reduces the regenerative braking torque on the turn outer-wheel side of the either one of the front and rear wheels more than the regenerative braking torque on the turn inner-wheel side when the turn spin suppression control is executed during deceleration travel.

* * * * *